United States Patent
Sueki et al.

(10) Patent No.: US 10,036,882 B2
(45) Date of Patent: Jul. 31, 2018

(54) IMAGE PROCESSING METHOD AND IMAGE PROCESSING APPARATUS FOR CELLS CARRIED IN CONTAINER

(71) Applicant: SCREEN HOLDINGS CO., LTD., Kyoto (JP)

(72) Inventors: Hiroshi Sueki, Kyoto (JP); Masayoshi Kobayashi, Kyoto (JP); Hiroki Fujimoto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 15/125,848

(22) PCT Filed: Jul. 10, 2015

(86) PCT No.: PCT/JP2015/069893
§ 371 (c)(1),
(2) Date: Sep. 13, 2016

(87) PCT Pub. No.: WO2016/051912
PCT Pub. Date: Apr. 7, 2016

(65) Prior Publication Data
US 2017/0003490 A1    Jan. 5, 2017

(30) Foreign Application Priority Data
Sep. 30, 2014    (JP) .................................. 2014-199857

(51) Int. Cl.
*G06K 9/00* (2006.01)
*G02B 21/36* (2006.01)
(Continued)

(52) U.S. Cl.
CPC ............. *G02B 21/367* (2013.01); *G02B 7/36* (2013.01); *G06T 5/50* (2013.01); *G06T 7/60* (2013.01);
(Continued)

(58) Field of Classification Search
None
See application file for complete search history.

(56) References Cited

U.S. PATENT DOCUMENTS 4,823,194 A * 4/1989 Mishima .................. G06K 9/36
                                                      348/254
6,344,930 B1   2/2002 Kaneko et al.
(Continued)

FOREIGN PATENT DOCUMENTS

CN    101924899 A    12/2010
CN    102434824 A    5/2012
(Continued)

OTHER PUBLICATIONS

Search Report issued in corresponding International Application No. PCT/JP2015/069893, dated Oct. 13, 2015.
(Continued)

*Primary Examiner* — Tahmina Ansari
(74) *Attorney, Agent, or Firm* — McDermott Will & Emery LLP

(57) ABSTRACT

An image processing apparatus includes a holder holding a carrier carrying cells, an imager including an imaging optical system in which an optical axis is oriented toward the carrier, and images the cells in a bright field, a position changer changing a focus position of the imaging optical system in a direction along the optical axis, a controller changing a set position of the focus position by the position changer and obtaining a plurality of original images by causing the imager to perform imaging at each set position, and an image processor calculating a contrast value of each original image, specifying two set positions at opposite sides of a local minimum value of the contrast value in a profile of the contrast value in relation to the set position and
(Continued)

generating a difference image of two of the original images respectively imaged at the two set positions.

13 Claims, 6 Drawing Sheets

(51) Int. Cl.
    *G02B 7/36*     (2006.01)
    *G06T 5/50*     (2006.01)
    *G06T 7/60*     (2017.01)
    *G02B 21/24*     (2006.01)

(52) U.S. Cl.
    CPC .. *G02B 21/241* (2013.01); *G06T 2207/10056* (2013.01); *G06T 2207/10148* (2013.01); *G06T 2207/20192* (2013.01); *G06T 2207/20224* (2013.01); *G06T 2207/30024* (2013.01); *G06T 2207/30242* (2013.01)

(56) References Cited

U.S. PATENT DOCUMENTS

| | | | |
|---|---|---|---|
| 2005/0168808 A1* | 8/2005 | Ishiwata | G02B 21/14 359/368 |
| 2010/0310191 A1 | 12/2010 | Sato | |
| 2013/0336596 A1 | 12/2013 | Toyoda et al. | |
| 2014/0064632 A1 | 3/2014 | Manabe | |
| 2014/0065637 A1* | 3/2014 | Kirk | G01N 15/1463 435/7.1 |
| 2017/0003490 A1* | 1/2017 | Sueki | G02B 7/36 |

FOREIGN PATENT DOCUMENTS

| | | |
|---|---|---|
| CN | 103460682 A | 12/2013 |
| CN | 103685968 A | 3/2014 |
| EP | 1811017 A1 | 7/2007 |
| EP | 1930717 A1 | 6/2008 |
| EP | 2023127 A1 | 2/2009 |
| JP | 2000-316120 A | 11/2000 |
| JP | 2005-218379 A | 8/2005 |
| JP | 2008-020498 A | 1/2008 |

OTHER PUBLICATIONS

Office Action issued in corresponding Chinese Patent Application No. 201580011597.2, dated Jan. 31, 2018.

Extended European Search Report issued in corresponding EP Patent Application No. 15847326.4, dated May 17, 2018.

* cited by examiner

FIG. 3

| CELL TYPE: ABBREVIATED NAME | ΔZ[μm] | |
| --- | --- | --- |
|  | NA=0.2 | NA=0.5 |
| HUMAN CERVICAL CANCER CELL: HeLa | 20 | 10 |
| MOUSE FETAL SKIN CELL: NIH3T3 | 30 | 40 |
| HUMAN NORMAL LUNG-DERIVED FIBROBLAST CELL: WI-38 | 10 | 20 |
| HUMAN NORMAL LUNG-DERIVED FIBROBLAST CELL (MALIGNANT TRANSFORMATION): VA-13 | 20 | 20 |
| HUMAN NEUROBLASTOMA 1: SHSY5Y | 10 | 10 |
| HUMAN NEUROBLASTOMA 2: NB-1 | 20 | 20 |

IMAGE PROCESSING METHOD AND IMAGE PROCESSING APPARATUS FOR CELLS CARRIED IN CONTAINER

CROSS REFERENCE

This application is the U.S. National Phase under 35 U.S.C. § 371 of International Application No. PCT/JP2015/069893, filed on Jul. 10, 2015, which claims the benefit of Japanese Application No. 2014-199857, filed on Sep. 30, 2014, the entire contents of each are hereby incorporated by reference.

TECHNICAL FIELD

This invention relates to an image processing technique applied to an image obtained by imaging cells carried in a container and particularly to a technique for obtaining an image with clear contours of cells.

CROSS REFERENCE TO RELATED APPLICATION

The disclosure of Japanese Patent Application No. 2014-199857 filed on Sep. 30, 2014 including specification, drawings and claims is incorporated herein by reference in its entirety.

BACKGROUND ART

In medical and bioscience experiments, cells as an observation object have been imaged by a CCD camera or the like and converted into data, and various image processing techniques have been applied to this image data for observation and analysis. Conventionally, cells have been dyed using a dye to enhance the visibility of the cells. To suppress damage given to the cells, it is required to image the cells without dyeing them in some cases. However, since cytoplasm of the undyed cells are almost colorless and transparent, it is difficult to obtain an image with high quality. Particularly, it is difficult to obtain an image with a high contrast in bright field imaging.

A technique for imaging undyed cells using a phase difference microscope is disclosed as a technique for imaging substantially transparent cells in patent literature 1. In this technique, a difference image of two contrast images having mutually different signs of a phase difference is generated from those images. Specifically, a difference of images imaged in a defocused manner by a very short distance from an in-focus position toward a near point side and a far point side is obtained. Thus, it is a premise to perform imaging after the in-focus position is grasped. However, a method for adjusting a focus position for a substantially transparent object is not described in patent literature 1.

It is thought to be possible to apply, for example, a technique described in patent literature 2 as a method for obtaining an in-focus position in this case. In this technique, imaging is performed while a focus position is changed at equal intervals. A position where a contrast value is maximized in a difference image of two images having adjacent focus positions is set as an in-focus position.

CITATION LIST

Patent Literature

Patent literature 1: JP2005-218379A
Patent literature 2: JP2008-020498A

SUMMARY OF INVENTION

Technical Problem

By combining the above conventional techniques, it is thought to be possible to obtain an image with a high contrast also for transparent cells. However, the phase difference microscope described in patent literature 1 has generally a narrow imaging field of view and requires an objective lens and a condenser lens having large numerical apertures. Thus, an apparatus configuration tends to be complicated and high in cost. Further, since the in-focus position needs to be obtained, a process is also complicated.

On the other hand, such an imaging technique is often used for the purposes of obtaining the numbers and sizes of cells. For these purposes, a high-definition image is not always necessary and an image in which contour positions of cells are easily distinguishable is sufficient. Further, a relatively wide imaging range is preferably included. Thus, a technique for obtaining an image with clear contours of cells using a simpler apparatus configuration is desired, but such a technique has not been established yet thus far.

This invention was developed in view of the above problems and an object thereof is to provide a technique capable of generating an image with clear contours of cells by relatively simple apparatus configuration and process.

Solution to Problem

To achieve the above object, an image processing method according to this invention comprises arranging an imager including an imaging optical system with respect to a carrier carrying cells, changing a set position of a focus position of the imaging optical system in an optical axis direction of the imaging optical system in a multi-stage manner and imaging the cells in a bright field in each stage to obtain a plurality of original images, calculating a contrast value of each of the original images imaged in each stage, and generating a difference image of two of the original images imaged at two set positions at opposite sides of a local minimum value of the contrast value in a profile of the contrast value in relation to the set position.

Further, to achieve the above object, an image processing apparatus according to this invention comprises a holder which holds a carrier carrying cells, an imager which includes an imaging optical system arranged such that an optical axis is oriented toward the carrier and images the cells in a bright field by receiving light incident on the imaging optical system, a position changer which changes a focus position of the imaging optical system in a direction along the optical axis, a controller which changes a set position of the focus position by the position changer in a multi-stage manner and obtaining a plurality of original images by causing the imager to perform imaging at each set position, and an image processor which calculates a contrast value of each original image imaged at each set position, specifying two set positions at opposite sides of a local minimum value of the contrast value in a profile of the contrast value in relation to the set position and generating a difference image of two of the original images respectively imaged at the two set positions.

In the thus configured invention, the contrast value is obtained for each of the plurality of original images imaged with the focus position changed in a multi-stage manner. In the profile of the contrast value in relation to the setting of the focus position, a difference of two original images imaged at the two set positions at the opposite sides of the local minimum value is obtained. Thus, focusing difficult when an object is almost transparent is unnecessary. That is, it is neither necessary to obtain an in-focus position for the cells, nor is it necessary to perform imaging again after focusing.

Further, original images can be obtained by a general apparatus configuration for bright field imaging and an apparatus configuration for phase difference imaging is unnecessary. By obtaining the difference of the two original images imaged at the two set positions at the opposite sides of the local minimum value in the profile, an image having a contrast enhanced in contour parts of the cells is obtained. Specifically, according to the invention, it is possible to generate an image with clear contours of the cells by a simple apparatus configuration and a simple image processing.

Advantageous Effects of Invention

According to the invention, it is possible to generate a difference image from two original images specified by a profile of contrast values of a plurality of images imaged with a focus position changed in a multi-stage manner. Thus, it is not necessary to obtain the focus position and an apparatus configuration for performing phase difference imaging is unnecessary. Therefore, an image with clear contours of cells can be generated by a simple apparatus configuration and a simple image processing.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF DRAWINGS

FIG. 3 is a table showing changes of an image due to the focus position of the objective lens.

DESCRIPTION OF EMBODIMENTS

Hereinafter, two embodiments of an image processing method according to this invention are described. These two embodiments can be carried out using image processing apparatuses having the same configuration and the operations of the apparatuses are only partially different. Accordingly, the configuration of the image processing apparatus and a basic operation thereof are first described and, thereafter, image processing methods according to the two embodiments are described.

Figure 1:
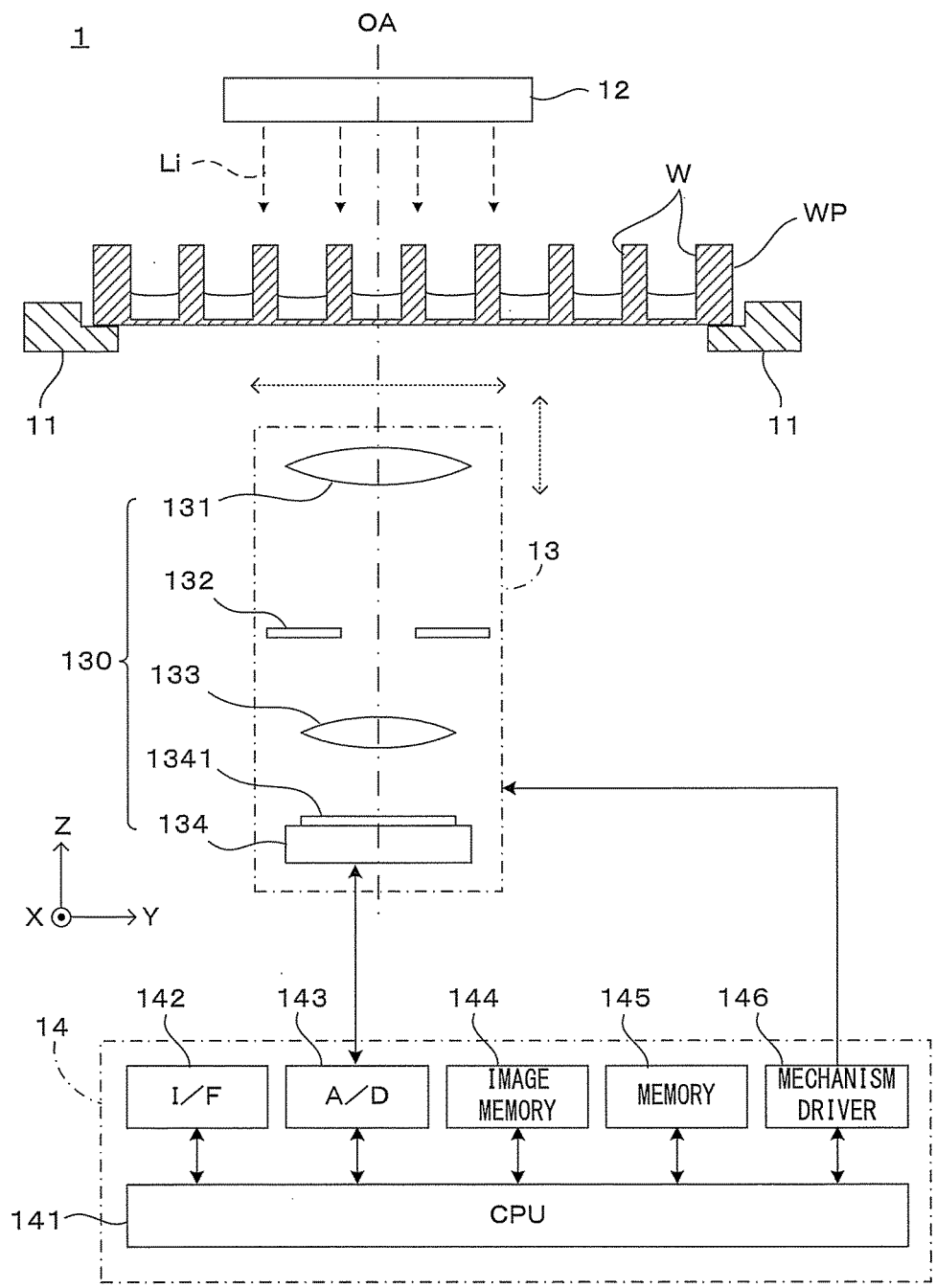
FIG. 1 is a diagram showing a schematic configuration of an image processing apparatus according to the invention.

FIG. 1 is a diagram showing a schematic configuration of an image processing apparatus according to the invention. This image processing apparatus 1 is an apparatus for imaging a sample in liquid poured into recesses called wells W formed on the upper surface of a well plate WP, processing a predetermined image processing upon the image in addition and outputting the image. For unified presentation of the directions in drawings, the XYZ orthogonal coordinate axes are established as shown in FIG. 1. The XY plane is a horizontal surface and the Z axis represents the vertical axis. In more detail, the (+Z) direction represents the vertically upward direction.

The well plate WP is generally used in the fields of drug discovery and bioscience. A plurality of wells W having a substantially circular cross-section and a transparent and flat bottom surface are disposed to the upper surface of a plate having a flat plate shape. The number of the wells W on the well plate WP is arbitrary. For example, a well plate WP having 96 (12×8 matrix array) wells can be used. A diameter and a depth of each well W are typically about several mm. Note that the size of a well plate and the number of wells used in this image processing apparatus 1 are arbitrary without being limited to these. For example, well plate having 384 wells is generally used.

A predetermined amount of liquid as a culture medium is poured into each well of the well plate WP, and cells, microorganisms and the like cultured under predetermined culture conditions in this liquid are imaging objects of this image processing apparatus 1. The culture medium may be added with appropriate reagents or may be gelled after being poured into the wells W in a liquid state. About 50 to 200 microliters of the liquid is generally usually used.

The image processing apparatus 1 includes a holder 11, an illuminator 12, an imager 13 and a controller 14. The holder 11 holds the well plate WP in a substantially horizontal posture by being held in contact with a peripheral edge part of the lower surface of the well plate WP carrying sample together with liquid in each well W. The illuminator 12 is arranged above the holder 11, meanwhile the imager 13 is arranged below the holder 11. The controller 14 includes a CPU 141 controlling the operation of these components The illuminator 12 emits illumination light Li toward the well plate WP held by the holder 11. For example, white light is used as the illumination light. For the purpose of imaging undyed cells described later, light having a small numerical aperture (NA), for example parallel light, is preferable as the illumination light. The samples in wells W disposed to the well plate WP are illuminated by the illuminator 12 from above. The numerical aperture value of the illumination light Li may be a value equal to or smaller than numerical aperture of an imaging optical system 130, for example.

The imager 13 is provided below the well plate WP held by the holder 11. In the imager 13, an objective lens 131 is arranged at a position right below the well plate WP. An optical axis OA of the objective lens 131 extends in a vertical direction (Z direction). From upper side to lower side along the optical axis OA of the objective lens 131, an aperture stop 132, an imaging lens 133 and an imaging device 134 are further disposed. The objective lens 131, the aperture stop 132 and the imaging lens 133 are arranged so that each of centers of these align along the Z axis and compose the imaging optical system 130 as a whole. Note that the components composing the imager 13 are arranged in line in this example. However, an optical path may be fold by reflecting mirror or the like.

The imager 13 is moved in the XYZ directions by a mechanism driver 146 provided in the controller 14. Specifically, the mechanism driver 146 moves the objective lens 131, the aperture stop 132, the imaging lens 133 and the imaging device 134 composing the imager 13 in the X direction and the Y direction integrally based on a control command from the CPU 141. By doing so, imager 13 moves in the horizontal direction. When imaging is performed with the imaging object in a well W, the mechanism driver 146 positions the imager 13 in the horizontal direction such that the well W is contained in an imaging field of view of the imager 13.

Further, the mechanism driver 146 performs focusing of the imager 13 with respect to the imaging object by moving the imager 13 in the Z direction. Specifically, the mechanism driver 146 moves the objective lens 131, the aperture stop 132, the imaging lens 133 and the imaging device 134 composing the imager 13 up or down integrally so as to adjust the focus of the objective lens 131 on the inner bottom surface of the well W.

Further, the mechanism driver 146 moves the illuminator 12 integrally with the imager 13 when the imager 13 is moved in the XY direction. Specifically, the illuminator 12 is arranged such that a center of emitted light substantially coincides with the optical axis of the imaging optical system 130. When the imager 13 moves in the XY direction, the illuminator 12 moves in conjunction with the imager 13 in the XY direction. In this way, the illuminating condition becomes constant regardless of which well W is to be imaged, wherefore imaging conditions can be maintained to be satisfactory. Instead of fixing the well plate WP and moving the imager 13, the imager may be fixed and the well plate W may be moved.

The bright field imaging of the sample in the well W is performed by the imager 13. Specifically, light emitted from the illuminator 12 and incident on the liquid surface from above the well W illuminates the imaging object. Light transmitted downward from the bottom surface of the well W is collected by the objective lens 131 and finally an image of the imaging object is formed on a light receiving surface of the imaging device 134 via the aperture stop 132 and the imaging lens 133. Thus, the image of the imaging object is received by a light receiving element 1341 of the imaging device 134. The light receiving element 1341 is a two-dimensional image sensor and converts a two-dimensional image formed on the surface thereof into an electric signal. A CCD sensor or a CMOS sensor can be used as the light receiving element 1341.

The image signal output from the light receiving element 1341 is send to the controller 14. Specifically, the image signal is input to an AD converter (A/D) 143 provided in the controller 14 and converted into digital image data. The CPU 141 performs appropriate image processings based on the received image data. The controller 14 further includes an image memory 144 for storing and saving image data and a memory 145 for storing and saving programs to be executed by the CPU 141 and data generated by the CPU 141, but these may be integrated. Further, the image memory 147 and the memory 148 may be realized by appropriately combining a high-capacity storage and a semiconductor memory.

Besides, the controller 14 is provided with an interface (I/F) 142. The interface 142 has a function of performing data exchange with an external apparatus connected via a communication line besides a function of receiving an operation input from a user and presenting information such as processing results to the user.

Next, the operation of the image processing apparatus 1 thus configured is described. The image processing apparatus 1 can image cells, bacteria, cell clusters (spheroids) and the like cultured in each well W of the well plate WP and imaged images are used for various observations and analyses.

Here is considered a case where undyed cells are imaged, the contours thereof are specified and the number and sizes of the cells are observed for the purpose of checking a proliferation status of the cells cultured in the wells W, for example. Conventionally, cells have been dyed with an appropriate dye for the purpose of optically observing the cells almost colorless and transparent. However, it is necessary in some cases to perform imaging without damaging cells such as for the purpose of observing the cells alive or checking a change with time. In such cases, it is necessary to image undyed cells.

In bright field imaging as in this image processing apparatus 1, it is difficult to image almost transparent cells with a high contrast. A method using a phase difference microscope is, for example, considered for imaging in such a case, but an apparatus configuration is complicated and expensive. In applications sufficient to be able to specify the contours of the cells as described above, it is preferable to obtain an image by a simpler apparatus configuration. This image processing apparatus 1 can meet such a request.

Figure 2A:
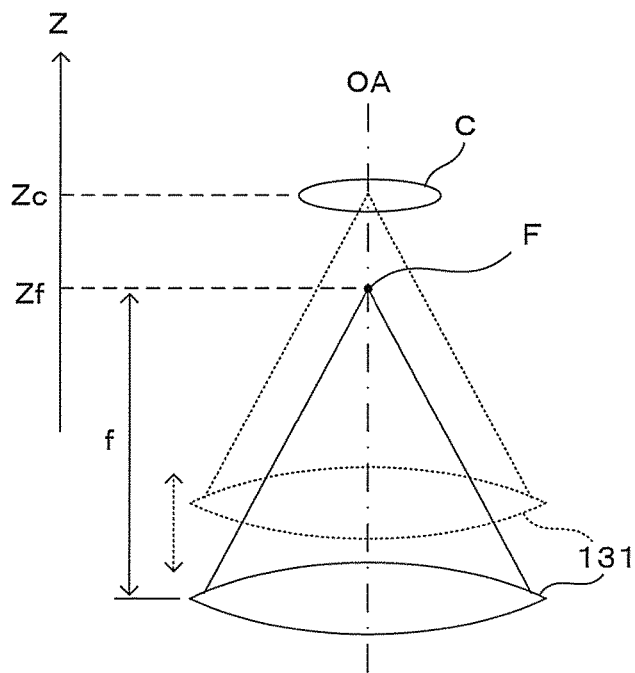
FIGS. 2A and 2B are diagrams showing a problem in the case of imaging transparent cells in a bright field.
Figure 2B:
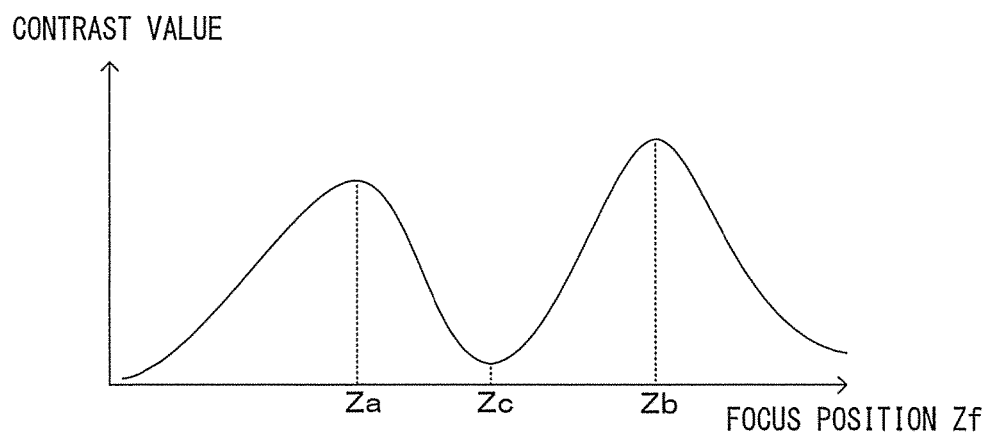

FIGS. 2A and 2B are diagrams showing a problem in the case of imaging transparent cells in a bright field. More specifically, FIG. 2A is a diagram schematically showing a positional relationship between a focal point F of the objective lens 131 and cells C during imaging. Further, FIG. 2B is a graph showing a relationship of a focus position and a contrast value of an image. A case is considered where the substantially transparent cells C are imaged while the focal point F of the objective lens 131 is changed in a direction of the optical axis OA (Z direction in this case) as shown in FIG. 2A. Zc denotes the position of the cells C as an imaging object in the Z direction and Zf denotes the position of the focal point F of the objective lens 131 in the Z direction. The objective lens 131 in the Z direction is located below the focus position Zf by a focal length f.

As shown in FIG. 2B, the contrast value is minimized when the focus position Zf in the Z direction substantially coincides with the position Zc of the cells C and the contrast value is higher before and after this point of coincidence. Note that such knowledge is also described, for example, in patent literature 2 described above. For the following description, Za, Zb denote the values of the focus positions Zf which give two local maximum values at opposite sides of a local minimum value in a profile of the contrast value in relation to the focus position shown in FIG. 2B.

Figure 3:
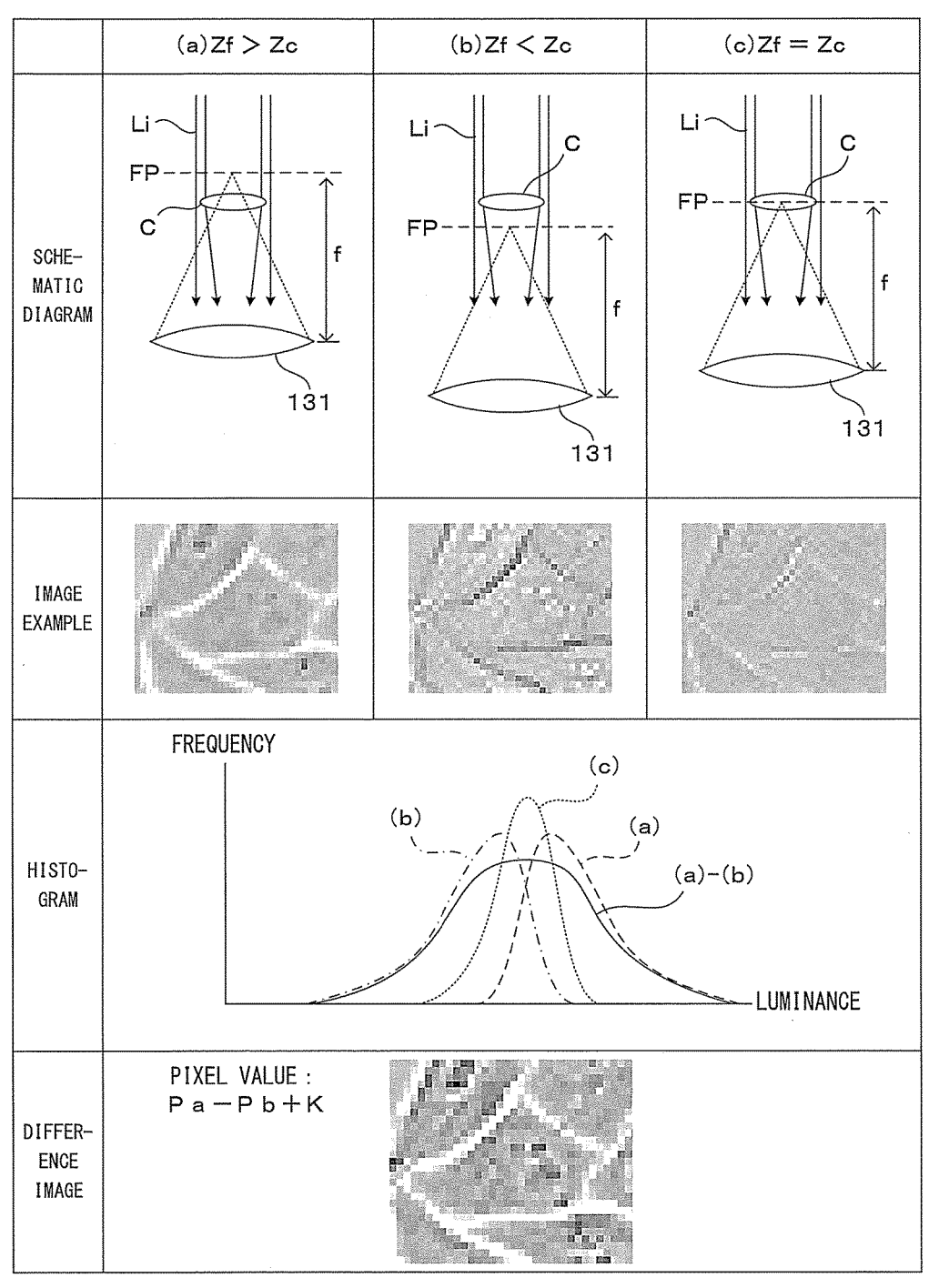

FIG. 3 is a table showing changes of an image due to the focus position of the objective lens. Image differences due to differences in the focus position are separately described in the following three cases: (a) Zf>Zc, (b) Zf<Zc and (c) Zf=Zc.

First, the case (c) where Zf=Zc is described. This case corresponds to a focusing state where a focal plane FP of the objective lens 131 is on the cells C. In this case, an image of the cells C is clear up to fine structures as shown in an image example, but a density difference is small and the contrast value of the image is smallest. In a histogram for the luminance of each pixel, a luminance variation is small. Thus, this case is not suitable, for example, for an application of binarizing an image or automatically extracting cell contours based on pixel values.

The case (a) corresponds to a case where the focal plane FP of the objective lens 131 is located further in the (+Z) direction than (above) the cells C, i.e. the cells C are at a shorter distance from the objective lens 131 than the focal length f of the objective lens 131. In this case, the objective lens 131 views the focal plane FP via the cells C. Further, the case (b) corresponds to a case where the focal plane FP of the objective lens 131 is located further in the (−Z) direction than (below) the cells C, i.e. the cells C are at a longer distance from the objective lens 131 than the focal length f of the objective lens 131. In these cases, luminance changes appear particularly in peripheral edge parts of the cells C due to a lens action by the transparent cells C.

Specifically, in the case (a) where the cells C are at a shorter distance from the objective lens 131 than the focal length f of the object 131, the luminance is high (bright) in the peripheral edge parts of the cells C. On the other hand, in the case (b) where the cells C are at a longer distance from the objective lens 131 than the focal length f of the object 131, the luminance is low (dark) in the peripheral edge parts of the cells C. Thus, a pixel value histogram spreads on a high luminance side in the case (a) while spreading on a low luminance side in the case (b). As just described, opposite luminance changes appear in the peripheral edge parts of the cells C in the cases (a) and (b). Note that since the focal point F of the objective lens 131 is not adjusted to the cells C, the sharpness of the image of the cells C is lower than the image of the case (c).

There is considered a case where a pixel-by-pixel difference is obtained between the image obtained by imaging in the case (a) and the image obtained by imaging in the case (b). In a difference image having a pixel value difference as a new pixel value of each pixel, a luminance value distribution in the histogram spreads to increase the contrast value of the image. Particularly, a brightness difference is emphasized in the peripheral edge part of the cell C having a large luminance difference. Thus, the difference image is an image which is not necessarily sharp for internal structures of the cells C, but indicates contour parts of the cells C with a high contrast.

A pixel value Pd of each pixel of the difference image can be expressed by the following equation using pixel values Pa, Pb of the same pixel of the images respectively obtained by imaging in the cases (a) and (b) and a constant K:

$$Pd=Pa-Pb+K.$$

The constant K is an offset value for avoiding that the pixel value Pd becomes a negative value depending on the content of the image. The constant K may be determined in advance based on an expected distribution of pixel values or may be dynamically determined according to a calculation result of a difference (Pa−Pb) of the pixel values. However, a single constant K is applied to each pixel in one difference image. Note that at least one of the pixel values Pa, Pb may be multiplied by an appropriate coefficient in the above equation.

As just described, a difference image of two images imaged with focus positions made mutually different may be generated to obtain an image with clear contours of the cells C. However, for the purpose of enhancing the contours, two images need to be imaged at two focus positions at opposite sides of the focus position (Zf=Zc) where the contrast value is a local minimum value in the profile of the contrast value in relation to the focus position. Further, to maximize a contour enhancement effect, it is more preferable to image two images at focus positions close to the two focus positions Za, Zb where the contrast value is the local maximum value in the profile shown in FIG. 2B. The contents of a specific process to achieve such a purpose are described below.

Figure 4:
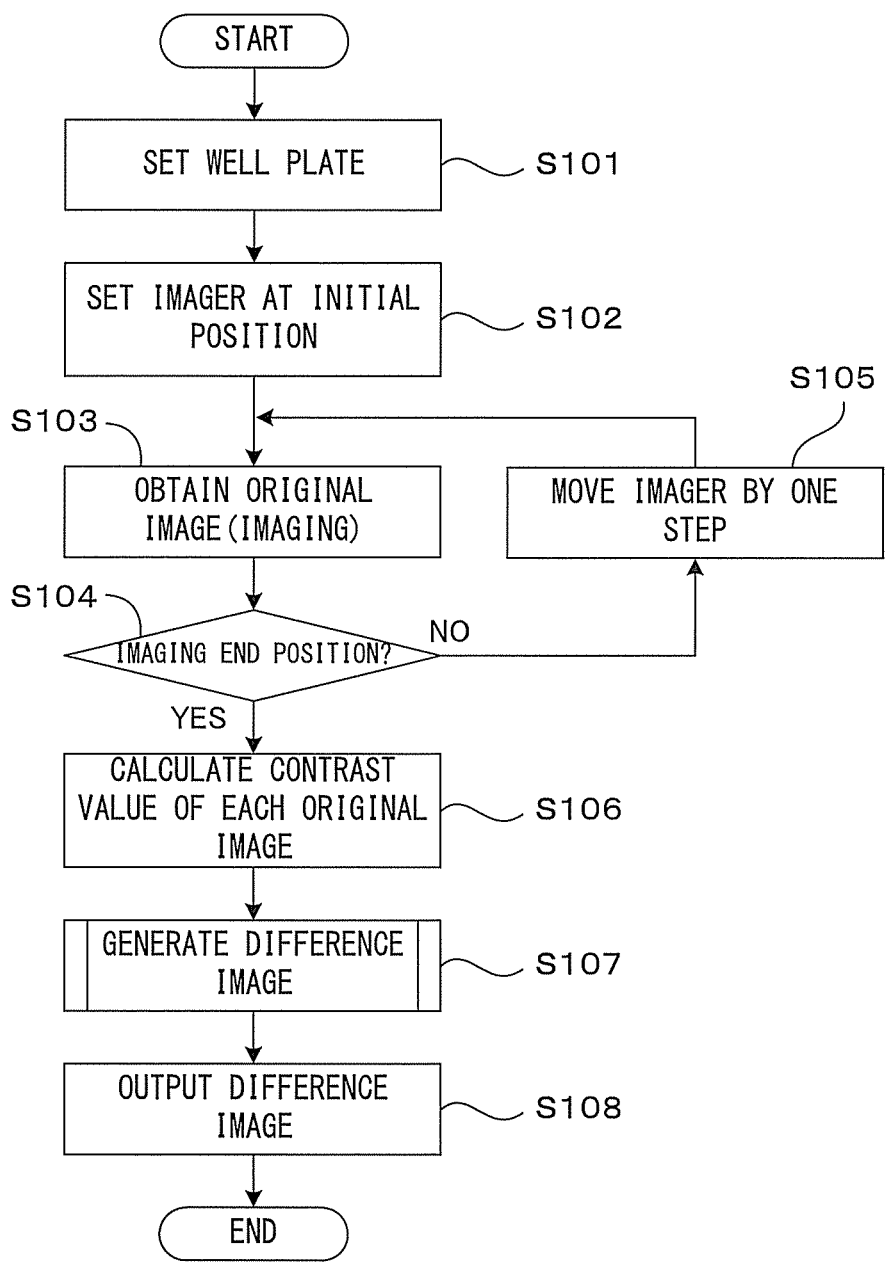
FIG. 4 is a flow chart showing a process of generating a difference image.

FIG. 4 is a flow chart showing a process of generating a difference image. This process is realized by the CPU 141 executing, for example, a control program stored in the memory 145 and controlling each part of the apparatus based on this control program. First, the well plate WP including the wells W in which cells to be imaged are cultured is set on the holder 11 (Step S101). Subsequently, the imager 13 is set at a predetermined initial position (Step S102). An initial position of the imager 13 in the horizontal direction is a position where a center of the well W to be imaged and the optical axis OA of the imaging optical system 130 coincide. Further, an initial position of the imager 13 in the vertical direction is a position closest to the bottom surface of the well plate WP out of a variable range of the imager 13 in the vertical direction.

Subsequently, the well W is imaged by the imager 13 to obtain one original image (Step S103), the imager 13 is moved downward by one step which is a predetermined interval (Step S105) and imaging is performed again (Step S103). The movement of the imager 13 by one step and the imaging as just described are repeated until the imager 13 reaches an imaging end position, i.e. a position bottommost in the variable range thereof and most distant from the bottom surface of the well plate WP (Step S104). In this way, a plurality of original images imaged with the focus position of the imaging optical system 130 made mutually different in the vertical direction are obtained. These original images are stored and saved in the image memory 144.

The size of the cells C to be imaged is generally several μm to several tens of μm. A movement of the imager 13 corresponding to this can be, for example, about 2 μm to 10 μm per step.

The CPU 141 calculates a contrast value of each of the thus obtained original images (Step S106). Several methods are known as a contrast value calculation method and an arbitrary one can be applied as long as the same method is used in each original image. For example, a difference between a pixel value of a pixel having a highest luminance and a pixel value of a pixel having a lowest luminance value in an original image can be set as a contrast value of this original image.

Subsequently, the CPU 141 generates a difference image by a predetermined image processing based on two original images extracted from the plurality of imaged original images (Step S107). There are two embodiments based on mutually different principles for this difference image generation method and those are described later. The generated difference image has the contours of the cells C enhanced and is stored and saved in the image memory 144. The generated difference image is output as an output image via the interface 142 if necessary (Step S108). As an image output mode, the difference image may be displayed on a display provided as a part of the interface 142. Further, image data of the difference image may be output to an external apparatus or an external storage medium.

Figure 5A:
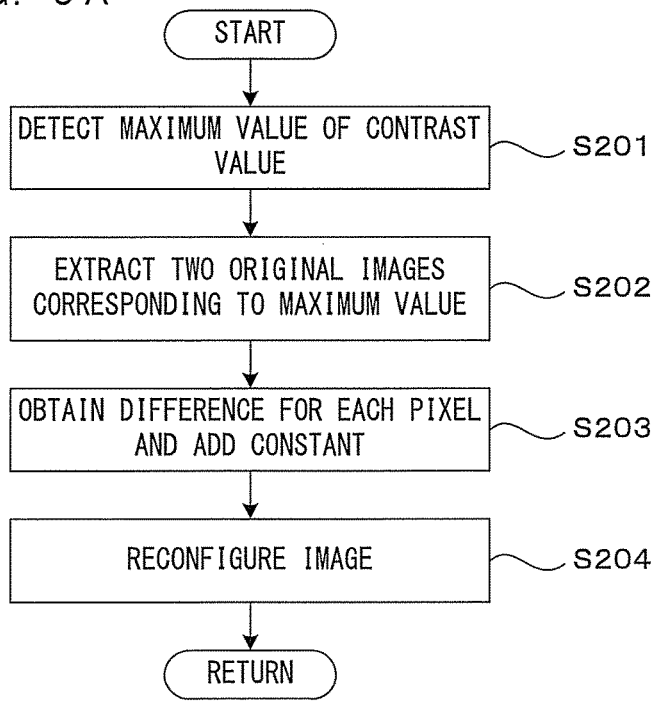
FIGS. 5A and 5B are flow charts showing two modes of generating a difference image.
Figure 5B:
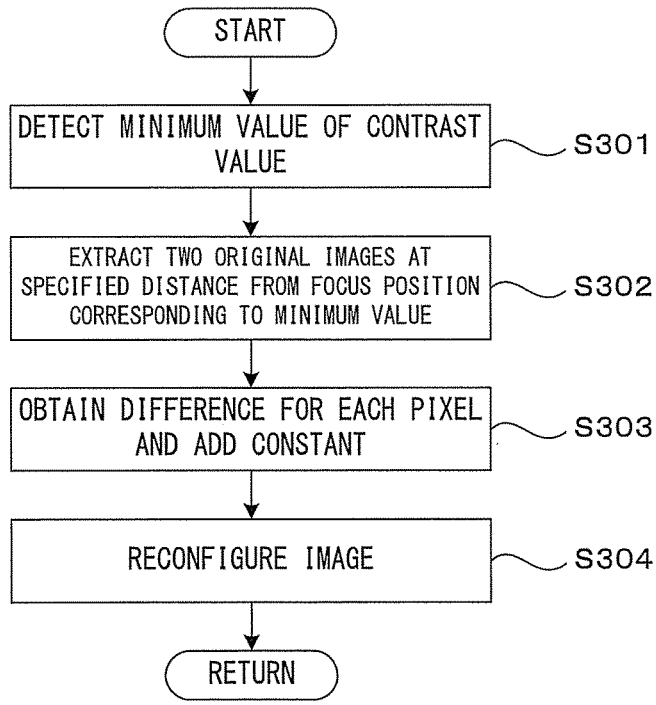

FIGS. 5A and 5B are flow charts showing two modes of generating a difference image. More specifically, FIG. 5A shows a first embodiment of an image processing for generating the difference image and FIG. 5B shows a second embodiment of the image processing for generating the difference image. In these embodiments, original images as a basis of the difference image are selected based on a local maximum value or a local minimum value of a contrast value in a virtual profile in which the contrast values of the respective original images calculated as described above are arranged along set values of the focus position when these original images were imaged. Note that it is sufficient to obtain the local maximum value or the local minimum value in the profile by a certain method and a process for actually obtaining the profile is not required.

In the process of the first embodiment shown in FIG. 5A, two local maximum values of the contrast value in the profile are detected (Step S201). The local maximum value can be detected, for example, by obtaining a point of change from a contrast value increasing phase to a contrast value decreasing phase as the set value of the focus position changes in the profile. Then, the set values of two focus positions giving these local maximum values are obtained (Step S202). These two set values are supposed to be values close to the values Za, Zb in FIG. 2B.

Two original images respectively corresponding to the two local maximum values obtained in this way are extracted, a pixel value difference is obtained for each pixel between those original images, and the constant K as an offset value is added. In this way, the pixel value of each pixel constituting the difference image is obtained (Step S203). By reconfiguring an image in which the pixels having the obtained pixel values are arrayed in a predetermined arrangement (Step S204), the difference image is obtained.

Note that the local maximum values of the contrast value in the profile are not used for computation thereafter as described above. Thus, strictly speaking, the processing of obtaining the local maximum values of the contrast value in Step S201 is not always necessary and it is sufficient to know the set values of the focus positions corresponding to the local maximum values.

As just described, in this embodiment, a difference image is generated based on two original images corresponding to two local maximum values in a profile of contrast values of images in relation to set values of a focus position out of a plurality of original images imaged while the set value of the focus position is changed in a multi-stage manner. In this case, the contrast values may be directly obtained from the imaged original images and two peak parts in the profile may be found to obtain local maximum values thereof. Thus, the in-focus position of the imaging optical system 130 with respect to the cells C needs not to be known. Further, since the difference image is generated from the already imaged original images, it is not necessary to obtain images after the in-focus position is specified. Thus, the process is simple.

Note that the detected local maximum values do not necessarily coincide with the contrast values corresponding to the positions Za, Zb shown in FIG. 2B since imaging is performed while the focus position is discretely changed. However, for the purpose of obtaining an image clearly showing contours of cells, two original images used to generate a difference image have only to be respectively extracted from two peak parts at opposite sides of a local minimum value in the profile. Thus, whether or not the detected local maximum values coincide with actual local maximum values does not cause any problem as long as the focus position is not set at extremely large intervals. Specifically, a sufficient contour enhancement effect can be obtained by the above method.

On the other hand, in the process of the second embodiment shown in FIG. 5B, one local minimum value of the contrast value in the profile are detected (Step S301). Also in this case, the local minimum value itself needs not be obtained and it is sufficient to know the set value of the focus position giving the local minimum value. Two set values at a specified distance determined in advance from the set value of the focus position thus obtained are specified. A difference image is generated from two original images corresponding to these two set values (Step S302). A processing of obtaining the difference image (Steps S303, S304) is the same as in the first embodiment (Steps S203, S204).

Figures 6A, 6B:
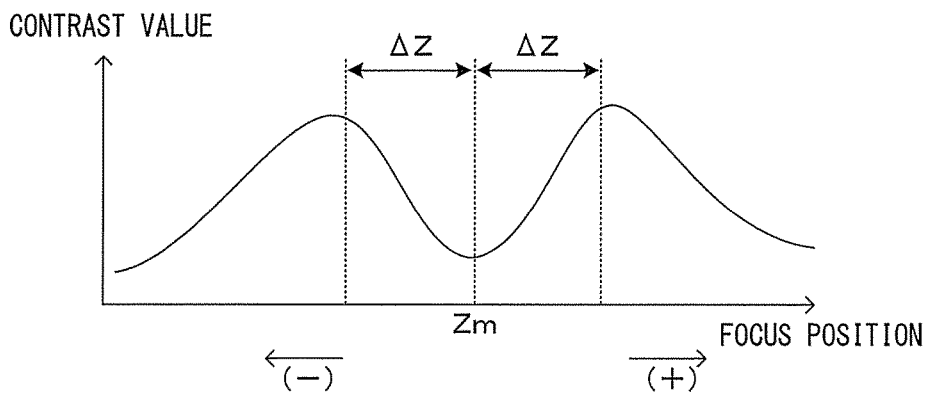
FIGS. 6A and 6B are a graph and a table more specifically showing the difference image generation process in the second embodiment.

FIGS. 6A and 6B are a graph and a table more specifically showing the difference image generation process in the second embodiment. In this embodiment, a set value Zm giving a local minimum value is obtained in the profile of the image contrast value in relation to the set value of the focus position as shown in FIG. 6A. This value Zm is estimated to be a position near the focus position Zc shown in FIG. 2B, but both may not coincide. Two original images corresponding to positions respectively at a distance $\Delta Z$ from this position Zm in (+) and (−) directions are used as original images as a basis of the difference image.

According to the knowledge of the inventors of the application, a distance between the focus position giving the local minimum value of the contrast value and the focus position giving the local maximum value in the profile of the contrast value in relation to the focus position depends on the type of the cells C. Thus, this distance can be substantially predicted if the type of the cells C in the well W is known. Therefore, if this distance $\Delta Z$ is set in advance according to the type of the cells C and the set value Zm of the focus position corresponding to the local minimum value is obtained, two original images used for the generation of the difference image can be immediately selected.

Further, according to the knowledge of the inventors of the application, the distance between the focus position giving the local minimum value and the focus position giving the local maximum value in the profile differs depending to a numerical aperture (NA) of the imaging optical system 130 even if cells are of the same type. Thus, if the imaging optical system 130 is, for example, configured to be interchangeable and a value of NA is changed, the distance $\Delta Z$ is preferably set according to the NA value.

For example, as shown in FIG. 6B, a relationship of the cell type, the NA of the imaging optical system 130 and the distance $\Delta Z$ can be obtained, formulated into a table in advance and stored and saved in the memory 145. In the processing of Step S302, the distance $\Delta Z$ may be obtained by reference to the table from information on the cell type given in advance and the NA value of the imaging optical system 130, and two original images at this distance $\Delta Z$ from the set value Zm corresponding to the local minimum value may be selected.

By doing so, as in the first embodiment, one original image can be selected respectively from each of two peak parts at the opposite sides of the local minimum value in the profile. By taking a difference between these two original images, a difference image with clear contours of cells can be obtained. Also in this case, the in-focus position needs not be obtained and two original images as a basis of the difference image can be easily selected based on the contrast values directly obtained from the original images.

It is possible to generate a difference image from original images obtained by general bright field imaging by either one of the methods according to these embodiments. Thus, an image with clear contours of cells can be obtained by a relatively simple apparatus configuration and a simple process without requiring a complicated configuration such as a phase difference observation optical system.

As described above, in the above embodiment, the well plate WP corresponds to a "carrier" of the invention and the holder 11 functions as a "holder" of the invention. Further, the imager 13 functions as an "imager" of the invention. Further, the mechanism driver 146 functions as a "position changer" of the invention, whereas the CPU 141 has functions as a "controller" and an "image processor" of the invention.

Further, in the above embodiment, the illuminator 12 functions as an "illuminator" of the invention and the memory 145 functions as a "storage" of the invention. Further, the constant K in the above embodiments corresponds to an "offset amount" of the invention.

Note that the invention is not limited to the above embodiments and various changes other than those described above can be made without departing from the gist of the invention. For example, the aperture stop and the focusing lens are provided in the imaging optical system in each of the above embodiments. However, functions and effects similar to those of the above embodiments can be obtained by applying the invention even if the imaging optical system does not include at least one of these. Further, although the entire imaging optical system 130 vertically moves to change the focus position in the above embodiments, the focus position may be changed, for example, by changing distances between a plurality of lenses constituting the imaging optical system.

Further, two original images corresponding to two local maximum values in the profile are selected in the first embodiment, whereas two original images corresponding to the positions at the predetermined distance ΔZ from the focus position Zm corresponding to the local minimum value are selected in the second embodiment. However, in the technical concept of the invention, it is sufficient to select original images selected from each of two peak parts at the opposite sides of the local minimum value in the profile and that selection method is not limited to the above. However, since the sharpness of the image itself cannot be guaranteed with distance from the focus position other than at the in-focus position, it is preferable to avoid the selection of original images corresponding to positions more distant than the two local maximum values when viewed from the local minimum value.

Further, although the well plate WP provided with a multitude of wells W is used as the "carrier" of the invention in the above image processing apparatus 1, the shape of the "carrier" is not limited to this. For example, the invention can be applied also for the purpose of imaging cells cultured in a shallow container having a large diameter and called a "dish" or cells carried on a slide glass.

Further, although a configuration for imaging cells and a configuration for image processing are integrated in the image processing apparatus 1 of the above embodiment, these may be formed as separate units and connected to each other. For example, the image processing apparatus according to the invention can be configured by combining an existing microscope device having an imaging function and a terminal device such as a personal computer loaded with a control program for executing the image processing method according to the invention.

Further, as described by way of the specific embodiments, the invention may be configured to find, for example, two set positions respectively corresponding to two local maximum values at opposite sides of a local minimum value in a profile and generate a difference image of two original images respectively imaged at these two set positions. In such a configuration, since the difference image is generated from the two original images having a largest contrast difference out of the imaged original images, the effect of contour enhancement in the difference image is maximized. In this case, it is not always necessary to obtain a local minimum value as long as two local maximum values are obtained.

Further, for example, a set position corresponding to a local minimum value in a profile may be found and a difference image of two original images respectively imaged at two set positions at opposite sides of the former set position respectively different from the former set position by a predetermined offset amount may be generated. In such a configuration, if a local minimum value in the profile is obtained, two original images can be immediately specified and a difference image can be generated from those original images.

Further, for example, if a plurality of types of cells and offset amounts corresponding to these cell types are associated in advance, it is also possible to set the offset amount corresponding to the cell type based on that information. If the type of cells to be imaged is known in advance, the size (particularly thickness) of the cells appearing in an image can be estimated to a certain extent. Thus, a focus position difference between two original images necessary to obtain a good contrast can also be predicted. If the offset amount corresponding to the setting of the focus position where the contrast value is locally minimum is prepared for each cell type in advance based on this prediction and a proper offset amount is applied according to the cell type, an image with enhanced contours of the cells can be easily obtained. Information representing a correspondence relationship of these can be obtained in advance and stored in a storage.

Further, according to the knowledge of the inventor of the application, a preferable offset amount differs depending on the numerical aperture of the imaging optical system even if the cell types are the same. Thus, by setting the offset amount according to the value of the numerical aperture of the imaging optical system, it is possible to obtain an image having the contours of the cells effectively enhanced by applying a more proper offset amount.

In the configuration for obtaining a difference of two original images pixel by pixel, a difference value may be a negative value and, in this case, such a value is improper as a pixel value of this pixel. To prevent this, a value obtained by adding the constant to the difference of each pixel value may be a pixel value of each pixel constituting the difference image. Even if the constant is added or subtracted in this way, the contrast of the contour parts is not affected. By doing so, a problem that the pixel value becomes a negative value can be avoided.

Further, this invention may be, for example, configured such that parallel light is incident as illumination light from above the carrier and the imager performs imaging by receiving the light transmitted downward through the carrier. Further, for example, undyed cells carried in the carrier may be imaged. In such a configuration, it is difficult to clearly show contours of the cells in an image since a difference in light transmittance between areas with the cells and areas without the cells is small. By applying the invention in such a case, an image with a high contrast particularly having contour parts enhanced can be obtained.

Although the invention has been described by way of the specific embodiments above, this description is not intended to be interpreted in a limited sense. By referring to the description of the invention, various modifications of the disclosed embodiments will become apparent to a person skilled in this art similarly to other embodiments of the invention. Hence, appended claims are thought to include these modifications and embodiments without departing from the true scope of the invention.

INDUSTRIAL APPLICABILITY

This invention can be particularly suitably applied to fields requiring the imaging of cells carried in a carrier such as wells on a well plate used, for example, in medical and bioscience fields, but its fields of application are not limited to the medical and bioscience fields.

REFERENCE SIGNS LIST 1 image processing apparatus
11 holder (holder)
12 illuminator (illuminator)
13 imager (imager)
14 controller
130 imaging optical system
141 CPU (controller, image processor)
145 memory (storage)
146 mechanism driver (position changer)
C cell
W well
WP well plate (carrier)

The invention claimed is:

1. An image processing method, comprising:
arranging an imager including an imaging optical system with respect to a carrier carrying cells;
obtaining a plurality of original images of the cells by bright-field imaging at different focus positions of the imaging optical system, the different focus positions being arranged in line with an optical axis of the imaging optical system;
calculating a contrast value of each of the original images obtained at the different focus positions to obtain a profile of contrast values relative to focus positions; and
generating a difference image from two of the original images obtained at two focus positions between which there is a focus position corresponding to a contrast value having a local minimum value in the profile.

2. The image processing method according to claim 1, further comprising finding two focus positions respectively corresponding to two local maximum values at opposite sides of the local minimum value in the profile, wherein
a difference image of two original images respectively imaged at the two focus positions is generated.

3. The image processing method according to claim 1, further comprising finding one focus position corresponding to the local minimum value in the profile, wherein
a difference image of two original images respectively obtained at two focus positions at opposite sides of the one focus position respectively different from the one focus position by a predetermined offset amount is generated.

4. The image processing method according to claim 3, wherein information in which a plurality of types of cells and offset amounts corresponding to the cell types are associated is prepared in advance and the offset amount corresponding to the cell type is set based on the information.

5. The image processing method according to claim 4, wherein the offset amounts are set individually with respect to different numerical aperture values of the imaging optical system.

6. The image processing method according to claim 1, wherein a pixel value of each pixel constituting the difference image is a value obtained by adding a constant to a difference of pixel values of each corresponding pixel of the two original images.

7. The image processing method according to claim 1, wherein parallel light is incident as illumination light from above the carrier and the imager performs imaging by receiving a light transmitted downward through the carrier.

8. The image processing method according to claim 1, wherein undyed cells carried in the carrier is imaged.

9. An image processing apparatus, comprising:
a holder which holds a carrier carrying cells;
an imager which includes an imaging optical system arranged such that an optical axis is oriented toward the carrier and images the cells by bright-field imaging by receiving light incident on the imaging optical system;
a position changer which changes a focus position of the imaging optical system in a direction along the optical axis;
a controller which controls the imager and the position changer to obtain a plurality of original images of the cells at different focus positions of the imaging optical system, the different focus positions being arranged in line with the optical axis; and
an image processor which calculates a contrast value of each of the original images obtained at the different focus positions to obtain a profile of contrast values relative to focus positions, specifying two focus positions between which there is a focus position corresponding to a contrast value having a local minimum value in the profile, and generating a difference image from the two of the original images.

10. The image processing apparatus according to claim 9, wherein the image processor finds two focus positions respectively corresponding to two local maximum values at opposite sides of the local minimum value in the profile and generates the difference image of two original images respectively imaged at the two focus positions set.

11. The image processing apparatus according to claim 9, wherein the image processor finds one focus position corresponding to a local minimum value in the profile and generates the difference image of two original images respectively imaged at two focus positions set positions at opposite sides of the one focus position respectively different from the one focus position by a predetermined offset amount.

12. The image processing apparatus according to claim 11, further comprising
a storage which stores information in which a plurality of types of cells and offset amounts corresponding to the cell types are associated in advance, wherein
the image processor sets the offset amount read out from the storage corresponding to the cell type.

13. The image processing method according to claim 9, further comprising
an illuminator which makes parallel light incident from above the carrier as illumination light, wherein
the imager performs imaging by receiving the light transmitted downward through the carrier.

* * * * *